(12) United States Patent
Chiodini

(10) Patent No.: US 6,950,483 B2
(45) Date of Patent: Sep. 27, 2005

(54) TIMING MISALIGNMENT ESTIMATION

(75) Inventor: Alain Chiodini, Mountain View, CA (US)

(73) Assignee: Proxim, Inc., Sunnyvale, CA (US)

( * ) Notice: Subject to any disclaimer, the term of this patent is extended or adjusted under 35 U.S.C. 154(b) by 899 days.

(21) Appl. No.: 09/802,588

(22) Filed: Mar. 8, 2001

(65) Prior Publication Data

US 2002/0176354 A1 Nov. 28, 2002

(51) Int. Cl.[7] .............................................. H04L 7/00
(52) U.S. Cl. ....................... 375/354; 370/503; 327/291; 327/141
(58) Field of Search ................................ 375/354, 355, 375/371, 377, 324, 326, 344; 327/141, 291; 370/503, 509, 512, 514; 455/182.1, 182.2, 182.3, 192.2, 192.3

(56) References Cited

U.S. PATENT DOCUMENTS

| | | | | |
|---|---|---|---|---|
| 6,191,906 B1 | * | 2/2001 | Buch | 360/51 |
| 6,415,004 B1 | * | 7/2002 | Fujimura et al. | 375/324 |
| 6,600,615 B1 | * | 7/2003 | Ashley et al. | 360/51 |
| 6,654,432 B1 | * | 11/2003 | O'Shea et al. | 375/354 |
| 6,788,485 B2 | * | 9/2004 | Ashley et al. | 360/51 |
| 2002/0094048 A1 | * | 7/2002 | Simmons et al. | 375/362 |
| 2002/0172187 A1 | * | 11/2002 | Shalvi et al. | 370/350 |
| 2003/0165027 A1 | * | 9/2003 | Ashley et al. | 360/51 |

* cited by examiner

Primary Examiner—Jean B Corrielus
(74) Attorney, Agent, or Firm—Thelen Reid & Priest LLP (57) ABSTRACT

Orthogonal frequency division multiplexing (OFDM) receiver embodiments of the invention provide timing misalignment estimation by calculating the intra-baud timing differential. The preferred method exploits the spectral structure of the short-preamble in that a time delay in the time-domain is manifest as a phase rotation in the frequency-domain. The timing misalignment is determined by special processing the spectral peaks of the modified short-preamble. An alternative embodiment linearly combines the two long-preamble symbols to construct a single "best estimate" long-preamble symbol. A normalized dot product of the "best estimate" long-preamble symbol and the ideal on-baud symbol is computed to obtain the magnitude of the timing misalignment. A dot product between the "best estimate" long-preamble symbol and the time derivative of the ideal on-baud sampled sequence is computed to obtain the sign of the timing misalignment.

8 Claims, 5 Drawing Sheets

TIMING MISALIGNMENT ESTIMATION

BACKGROUND OF THE INVENTION

1. Technical Field

The invention relates to physical layer (PHY) digital signal processing for use in processors developed for wireless local area networks (LAN's), and more particularly to wireless LAN's based on orthogonal frequency division multiplexing (OFDM) in the license-free national information structure (U-NII) radio spectrum bands in the United States and generally conforming to IEEE Specification 802.11a.

2. Description of the Prior Art

Local area networks (LAN's) have traditionally been interconnected by twisted-wire pairs and shielded cables. However, there are several deficiencies of traditional LAN's. The main being restricted mobility. In contrast, a whole class of untethered computing has emerged which uses complex modulation and coding to achieve high-speed data rates. The IEEE 802.11a standard, herein "802.11a", specifies, among other things, the physical layer (PHY) entity for an orthogonal frequency division multiplexing (OFDM) system with data payload communication capabilities of 6, 9, 12, 18, 24, 36, 48, and 54 Mb/s. The 802.11a standard specifies RF transmission in the 5.15–5.25, 5.25–5.35, and 5.725–5.825 GHZ unlicensed national information structure (U-NII) bands.

Typically, the IEEE communication standards specify the transmit bit-stream in addition to performance specifications, RF emissions requirements, etc. The wireless transmission medium inherently introduces some unique impairments (not present in traditional LAN's) to the transmitted signal which must be mitigated in the remote receiver station. These impairments include signal fading, multi-path reflections, base- and remote-unit oscillator mismatch introduced frequency offset, timing misalignment, and timing synchronization. In addition, there are RF hardware limitations such as receiver IQ imbalance and phase noise that must be mitigated as well. As such, the mitigation of such effects falls under the category of baseband digital signal processing. To assist the remote unit in mitigating these effects, a known training sequence is usually embedded into the transmit bit stream; this occurs at the expense of bandwidth. Of course, the same problems occur in the upstream direction (remote station transmitting to the base station), but it suffices to discuss the downstream digital signal processing.

In this disclosure, one such digital signal processing method, timing misalignment, is outlined. The term "timing misalignment" refers to the intra-baud timing offset between a received baud-rate sampled signal and what would be its on-baud sampled version. Without correction, the samples obtained are most likely to be off-baud and can cause serious degradation in demodulation. Note that the use of an equalizer supercedes the timing misalignment function when enabled. Therefore, the timing misalignment function can be used in certain situations only (when the transmission channel is simply described by a direct line-of-sight component and Gaussian noise for example).

It is assumed that some form of frequency correction has been applied to the signal prior to performing synchronization estimation. One embodiment of coarse frequency estimation is disclosed in "Coarse Frequency Offset Estimation—Patent Disclosure", Alain Chiodini, John Reagan, nBand Communications, 2000. In addition, it is assumed that data synchronization so that a timing reference is known. One embodiment of timing synchronization is disclosed in "OFDM Data Demodulator Timing Synchronization—Patent Disclosure", John Reagan, Alain Chiodini, nBand Communications, 2000.

Conventional methods for establishing timing misalignment estimation and correction are correlation with fractional baud misaligned reference signals. However, there are several disadvantages of this type of approach. These are: (a) several sequences need to be stored locally, i.e. the reference signal that is offset by k/N baud where k=−16:16, N=16, and (b) the prestored sequence does not account for signal distortions (A/D, quantization effects, phase distortion, IQ imbalance, . . . ) which results in non-optimal correlation values.

The transmission scheme in 802.11a is bursty. This means that the receivers must digitally process the training sequence to mitigate the undesired signal impairments each time a burst commences. This means that it is desirable for the processing blocks to be as robust and computationally efficient as possible. For example, to reduce computational complexity, the timing misalignment function can be used in lieu of an equalizer in situations when the transmission channel is simply described by a direct line-of-sight component and Gaussian noise.

SUMMARY OF THE INVENTION

Orthogonal frequency division multiplexing (OFDM) receiver embodiments of the invention provide timing misalignment estimation by calculating the intra-baud timing differential. The preferred method exploits the spectral structure of the modified short-preamble in that a time delay in the time-domain is manifest as a phase rotation in the frequency-domain. The timing misalignment is determined by special processing the spectral peaks of the short-preamble.

An alternative embodiment linearly combines the two long-preamble symbols to construct a single "best estimate" long-preamble symbol. A normalized dot product of the "best estimate" long-preamble symbol and the ideal on-baud symbol is computed to obtain the magnitude of the timing misalignment. A dot product between the "best estimate" long-preamble symbol and the time derivative of the ideal on-baud sampled sequence to obtain the sign of the timing misalignment.

DETAILED DESCRIPTION OF THE INVENTION

Figure 1:
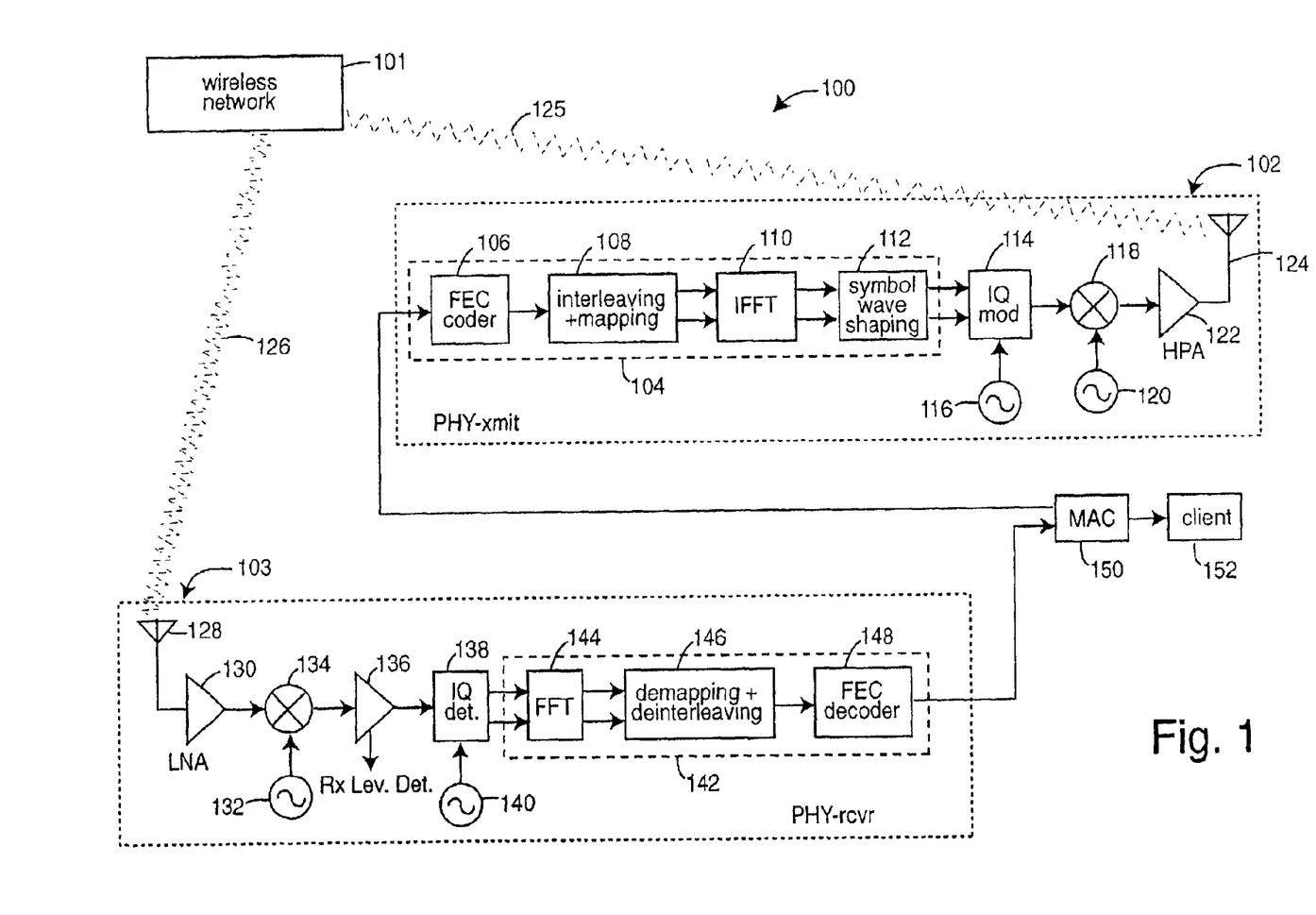
FIG. 1 is a functional block diagram of an OFDM radio-transceiver embodiment of the invention.

FIG. 1 illustrates a wireless local area network (LAN) embodiment of the invention, which is referred to herein by the general reference numeral 100. Such embodiment is preferably based on orthogonal frequency division multiplexing (OFDM), and quadrature amplitude modulated (QAM) of signals transmitted in the license-free 5 GHz frequency band. The wireless LAN 100 typically includes a wireless network 101 connected to the Internet, a PHY-transmitter 102, and a PHY-receiver 103. Such all conform to the IEEE-802.11a specification for a physical layer (PHY) interface in a wireless local area network which allows mobile clients. The transmitter 102 comprises a digital signal processor (DSP) 104 which implements a forward error correction (FEC) coder 106, an interleaving and mapping process 108, an inverse fast Fourier transform processor 110, and a symbol wave shaper 112. The DSP 104 outputs in-phase (I) and quadrature-phase (Q) signals that are input to an IQ modulator 114 driven by a local oscillator 116. The modulated output is sent to a mixer 118 for upconversion to the five GHz band. A second local oscillator 120 provides the necessary carrier frequency. A high power amplifier (HPA) 122 drives a transmitter antenna 124. A radio up-link 125 is received by the wireless network 101. In general, the transmitter 102 can be implemented with conventional methods and components.

The receiver 103 receives a radio down-link 126 that is typically transmitted in packets. Each packet is begun with a training sequence, e.g, a short and long preamble. The receiver 103 includes a receiver antenna 128 followed by a low-noise amplifier (LNA) 130. A local oscillator 132 and a first mixer 134 produce an intermediate frequency (IF). An automatic gain control (AGC) amplifier 136 smoothes out signal-strength variations and drives an IQ-detector 138. A second local oscillator 140 provides the carrier necessary to derive the I/Q samples, e.g. 16-bit binary at 20.0 MHz. In all embodiments of the present invention, no automatic frequency control (AFC) clock recovery is needed because any frequency offset errors are corrected in later digital processing. A receiver-DSP 142 comprises a fast Fourier transform process 144, a demapping and deinterleaving process 146, and an FEC decoder 148. The receiver-DSP 142 further includes the necessary digital logic needed for carrier frequency offset determination and correction.

The higher levels of the mobile client are represented by a media access controller (MAC) 150 and a client agent software 152.

A first embodiment of the invention for timing misalignment detection and correction works with the short preamble. A real signal constructed from the complex time-domain signal associated with the short preamble is discrete Fourier transform processed to gather timing misalignment information. The short preamble is comprised of ten 0.8 µs duration, i.e. 16-sample long at sampling frequency=20 MHz, sequences. The short preamble is mainly used for packet detection and coarse frequency offset estimation. In the absence of any frequency offset or other distorting effect, the short preamble is characterized by its imaginary (quadrature-phase) part which corresponds to its real (in-phase) part in almost every particular. The principle difference is the imaginary (quadrature-phase) part is delayed 0.4 µs (eight sample times) with respect to the real (in-phase) part.

Such phenomenon can be taken advantage of to decrease signal waveform processing complexity by simply adding real (in-phase) and imaginary (quadrature-phase) parts together. The resulting signal is characterized by a repeating 0.4 µs duration, eight-sample waveform δ(t). Then a 3.2 µs duration, i.e. 64-sample sequence is extracted from the short preamble. Spectrum-wise, this signal exhibits three equidistant, equal-amplitude frequency peaks. Assuming that the beginning of thee first 8-sample sequence of Δ(t) coincides with that of δ(t), timing offset information embedded within the phase of each of these frequency peaks can be represented with, $$\Phi_1(t) = \frac{\pi}{4}\left(1 + \frac{t}{T_s}\right)$$

$$\Phi_2(t) = \frac{\pi}{4}\left(1 + 2\frac{t}{T_s}\right)$$

$$\Phi_3(t) = \frac{3\pi}{4}\left(-1 + \frac{t}{T_s}\right)$$

where $$\frac{1}{T_s}$$

designates the sampling frequency (20 MHz).

The phase of such frequency peaks $\Phi_1$, $\Phi_2$ and $\Phi_3$ varies with the timing offset and depend on any misalignment existing between Δ(t) and δ(t). An intra-baud timing offset, or timing misalignment, τ( ) can be derived from $\Phi_1$, $\Phi_2$ and $\Phi_3$. For example, a received signal can be represented by, $$\Psi(t) = \Phi_1(t) + 2\Phi_2(t) + \Phi_3(t) =$$

$$\frac{\pi}{4}\left(1 + \frac{t}{T_s}\right) + 2\frac{\pi}{4}\left(1 + 2\frac{t}{T_s}\right) + \frac{3\pi}{4}\left(-1 + \frac{t}{T_s}\right) = 2\pi\frac{t}{T_s}.$$

In practice, $\Psi=(X_8P_1)(X_{16}P_2)^2(X_{24}P_3)$, where $X_k$ and $P_n$ respectively designate 64-point fast Fourier transform frequency components and the phase correcting coefficients needed compensate for phase offset errors cause by a misalignment between Δ(t) and δ(t). Plotting this results in a sawtooth waveform that reflects timing misalignment independent of timing offset.

The timing misalignment τ is expressed as a fraction of $T_s$, and is $$\tau = \frac{\Psi}{\pi}.$$

In general, preferred implementations of the present invention are designed to compute a 64-point fast Fourier transform rather than a three-point discrete Fourier transform.

Figure 2:
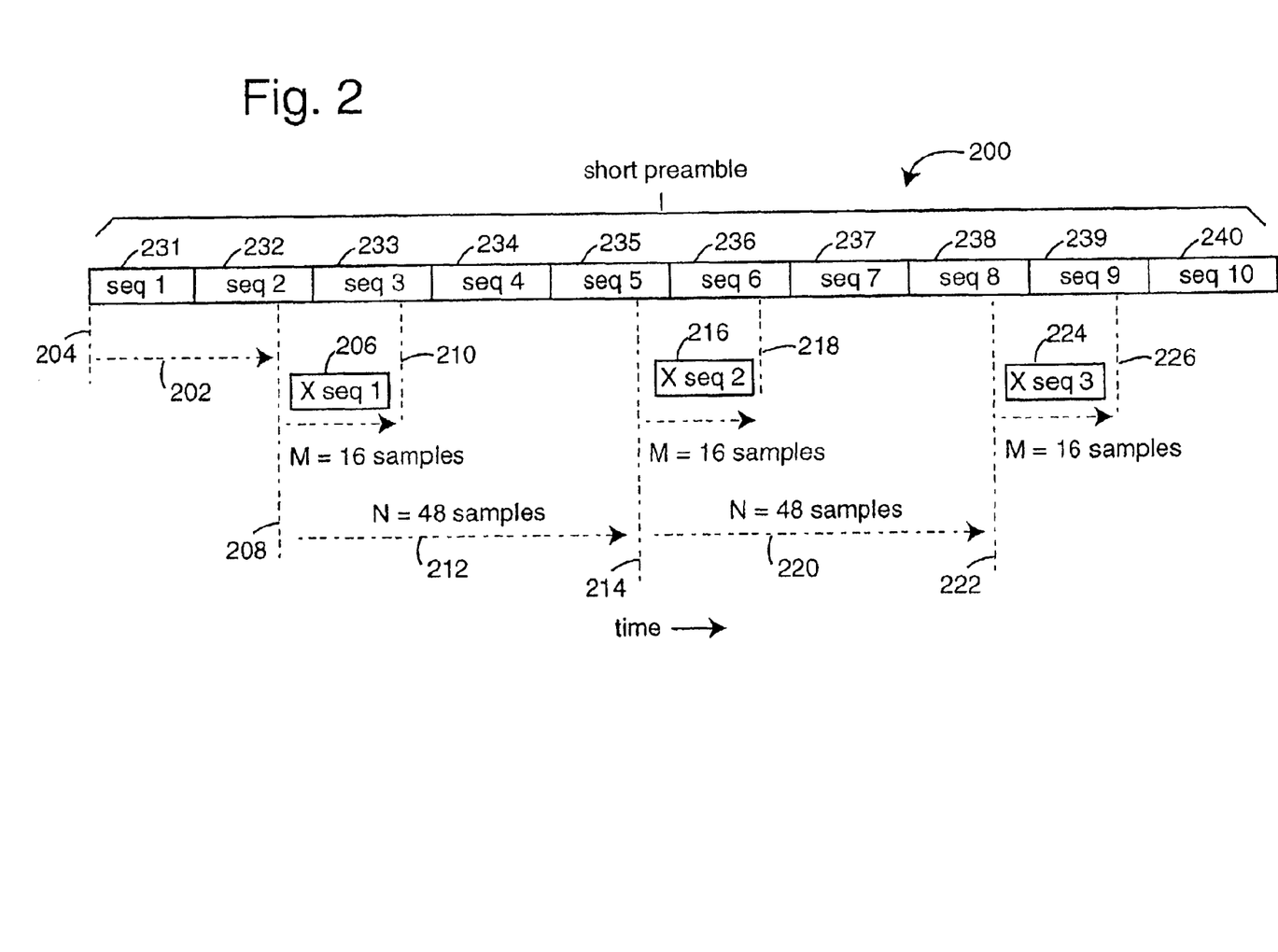
FIG. 2 is a diagram representing the sampling of the short preamble used in training sequences for the physical layer (PHY) of a wireless local area network (LAN) conforming to the IEEE-802.11a Specification.

FIG. 2 is a diagram representing the sampling of the short preamble used in training sequences for the physical layer (PHY) of a wireless local area network (LAN) conforming to the IEEE-802.11a Specification.

Figure 3:
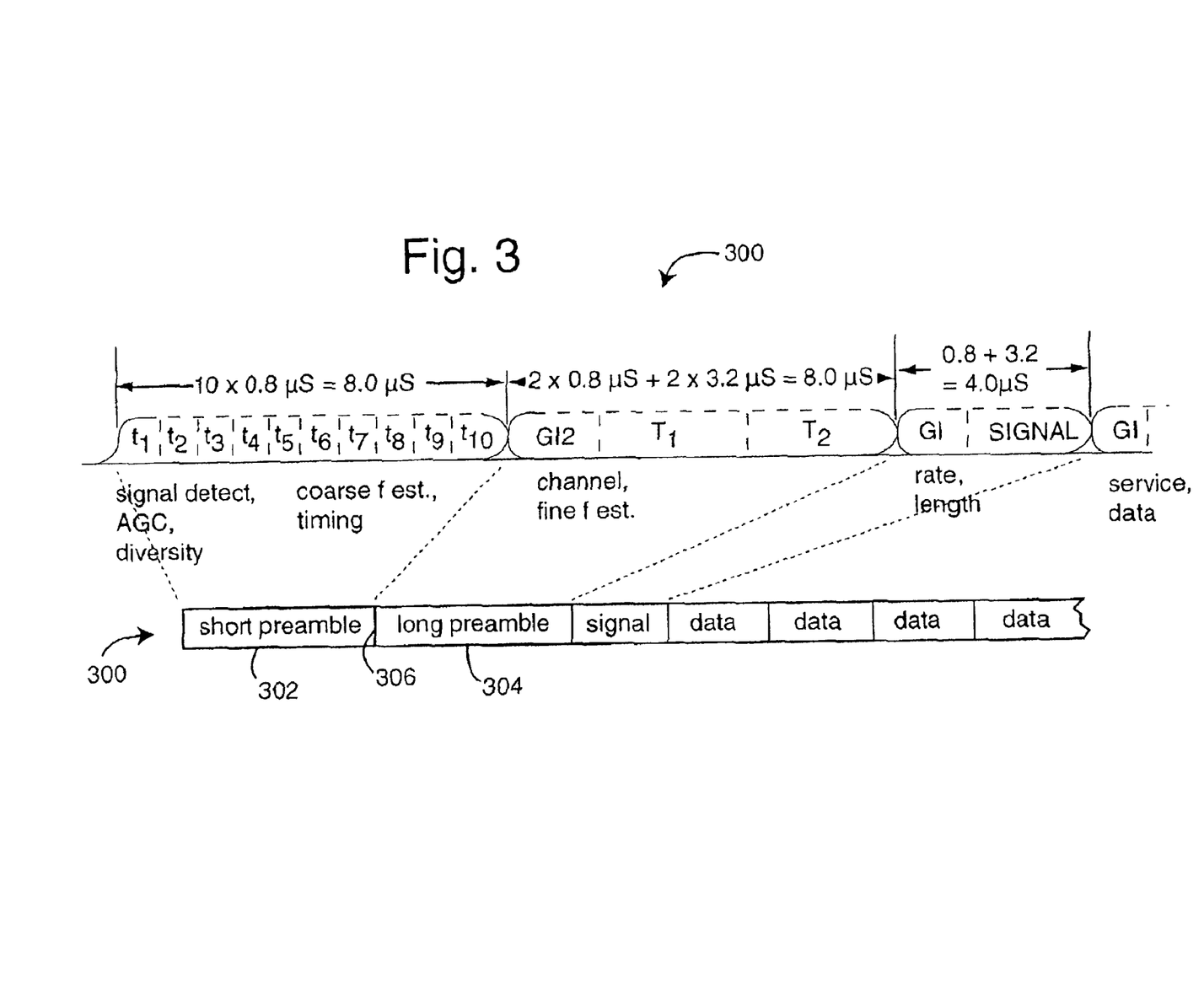
FIG. 3 is a diagram representing the structure of the synchronizing PLCP preamble, signal, and data fields used for the physical layer (PHY) of a wireless local area network (LAN) conforming to the IEEE-802.11a Specification.

FIG. 3 is a diagram representing the structure of the synchronizing PLCP preamble, signal, and data fields used for the physical layer (PHY) of a wireless local area network (LAN) conforming to the IEEE-802.11a Specification.

Figure 4:
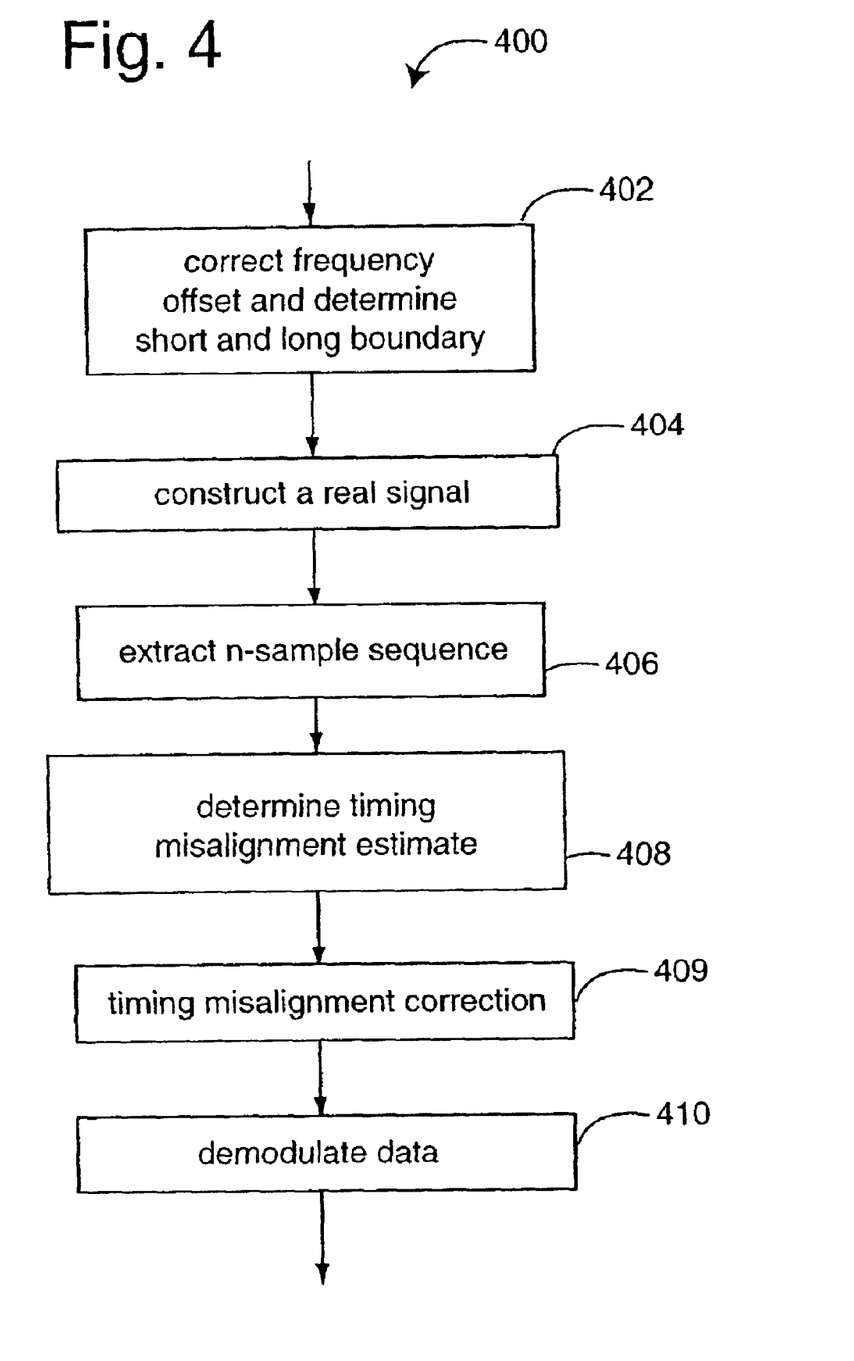
FIG. 4 is a flowchart of a first embodiment of the invention for determining the timing misalignment from the short preamble interval in the structure of FIG. 2.

FIG. 4 represents an embodiment of the invention for timing misalignment determination in a radio receiver, and is referred to herein by the general reference numeral 400. The embodiment 400 comprises a step element 402 for correcting a frequency offset and determining a boundary between a short preamble and a long preamble in a received radio signal; exemplary embodiments of these functions are described in "Coarse Frequency Offset Estimation—Patent Disclosure", Alain Chiodini, John Reagan, nBand Communications, 2000 and "OFDM Data Demodulator Timing Synchronization—Patent Disclosure", John Reagan, Alain Chiodini, nBand Communications, 2000. A step element 404 constructs a real signal from a complex time-domain signal associated with the short preamble. A step element 406 extracts a n-sample (n is preferably a power of 2 or 4 so that RADIX-2 or RADIX-4 FFT may be used subsequently) sequence from a portion of the short preamble to obtain a plurality of equidistant equal amplitude frequency peaks. A step element 408 determines a timing misalignment estimate by inspecting the relative phases of the plurality of equidistant equal amplitude frequency peaks. The objective is to thereafter be able to demodulate data encoded in the received radio signal. The step element 404 may include in-phase and quadrature-phase sampling of the received radio signal to obtain a real part and an imaginary part. The real and imaginary parts are assumed to be similar to one another except for a fixed time-skew between them. The step element 404 may also include a simple addition of the real and imaginary parts to obtain the real signal. The step element 408 can be such that phase of a set of three frequency peaks $\Phi_1$, $\Phi_2$ and $\Phi_3$ is assumed to vary with timing misalignment between $\Delta(t)$ and $\delta(t)$, and an intra-baud timing offset $\tau$ can be derived from $\Phi_1$, $\Phi_2$ and $\Phi_3$, wherein, a received signal can be represented by, $$\Psi(t) = \Phi_1(t) + 2\Phi_2(t) + \Phi_3(t) =$$
$$\frac{\pi}{4}\left(1 + \frac{t}{T_s}\right) + 2\frac{\pi}{4}\left(1 + 2\frac{t}{T_s}\right) + \frac{3\pi}{4}\left(-1 + \frac{t}{T_s}\right) = 2\pi\frac{t}{T_s}$$

and, $\Psi=(X_8 P_1)(X_{16} P_2)^2 (X_{24} P_3)$, where $X_k$ and $P_n$ respectively designate 64-point fast Fourier transform frequency components and the phase correcting coefficients needed compensate for phase offset errors cause by a misalignment between $\Delta(t)$ and $\delta(t)$, and the timing misalignment $\tau$ is expressed as a fraction of $T_s$, and is $$\tau = \frac{\Psi}{\pi}.$$

The step of determining preferably computes a 64-point fast Fourier transform rather than a three-point discrete Fourier transform. A step element 410 is then able to demodulate the transmitted data.

A second embodiment of the invention for timing misalignment and correction works with the long preamble rather than the short preamble. It is assumed that the position of the boundary between short and long preambles has been accurately determined. The two 64-sample long sequences that constitute the long preamble are linearly combined using least squares techniques to obtain an improved signal. This method captures the essential characteristics of the received signal and minimizes the impact of residual frequency offset and other distortions on the quality of estimation. The absolute value of any timing misalignment is estimated by computing a normalized dot product of the resulting signal and the ideal on-baud sequence whose derivative is used to determine the sign through the calculation of a second dot product. The minimization of the cost function (in the least square sense) described hereafter leads to two complex coefficients (also called weighting coefficients) that are used to combine the two 64-sample long sequences mentioned above into one idealized 64-sample sequence.

$$C(\alpha_1, \alpha_2) = \left\| \vec{R}_{on} - [\vec{X}_1 \ \vec{X}_2]\begin{bmatrix}\alpha_1 \\ \alpha_2\end{bmatrix} \right\|^2$$

-continued
$$= \left(\vec{R}_{on} - [\vec{X}_1 \ \vec{X}_2]\begin{bmatrix}\alpha_1 \\ \alpha_2\end{bmatrix}\right)^H \left(\vec{R}_{on} - [\vec{X}_1 \ \vec{X}_2]\begin{bmatrix}\alpha_1 \\ \alpha_2\end{bmatrix}\right)$$
$$= \left(\vec{R}_{on}^H - \alpha_1^* \vec{X}_1^H - \alpha_2^* \vec{X}_2^H\right)\left(\vec{R}_{on} - \alpha_1 \vec{X}_1 - \alpha_2 \vec{X}_2\right)$$
$$= \|\vec{R}_{on}\|^2 - 2\text{Re}\left(\alpha_1^* \vec{X}_1^H \vec{R}_{on}\right) - 2\text{Re}\left(\alpha_2^* \vec{X}_2^H \vec{R}_{on}\right) +$$
$$2\text{Re}\left(\alpha_1^* \alpha_2 \vec{X}_1^H \vec{X}_2\right) + |\alpha_1|^2 \|\vec{X}_1\|^2 + |\alpha_2|^2 \|\vec{X}_2\|^2$$

where,
$\vec{X}_1 = \vec{C}_1 \cdot x \vec{R}_{off} + \vec{N}_1$ is the first sequence of the long preamble,
$\vec{X}_2 = \vec{C}_2 \cdot x \vec{R}_{off} + \vec{N}_2$ is the second one,
$\vec{R}_{on}$ and $\vec{R}_{off}$ respectively designate the on-baud and off-baud sampled reference sequence,
$\alpha_1$ and $\alpha_2$ are the weighting coefficients, $$\vec{C}_1 = \begin{vmatrix} e^{j\varphi_1} \\ e^{j2\pi\frac{v}{F_s}+j\varphi_1} \\ \vdots \\ e^{j2\pi\frac{v}{F_s}63+j\varphi_1} \end{vmatrix}, \quad \vec{C}_2 = \begin{vmatrix} e^{j\varphi_2} \\ e^{j2\pi\frac{v}{F_s}+j\varphi_2} \\ \vdots \\ e^{j2\pi\frac{v}{F_s}63+j\varphi_2} \end{vmatrix}, \text{ and}$$

$v$ designates the frequency offset.

Minimizing $C(\alpha_1, \alpha_2)$ with respect to $\alpha_1$ and $\alpha_2$, $$\frac{\partial C}{\partial \alpha_1} = -\vec{R}_{on}^H \vec{X}_1 + \alpha_2^* \vec{X}_2^H \vec{X}_1 + \alpha_1^* \|\vec{X}_1\|^2$$
$$= -\sum_{n=0}^{63} R_{on}^*(n) R_{off}(n) e^{j2\pi\frac{v}{F_s}n+j\varphi_1} +$$
$$\alpha_2^* e^{j(\varphi_1-\varphi_2)} \sum_{n=0}^{63} |R_{off}(n)|^2 + \alpha_1^*\left(\|\vec{R}_{off}\|^2 + \sigma_N^2\right)$$
$$= -e^{j\varphi_1} P + \alpha_1^*(S + \sigma_N^2) + \alpha_2^* e^{j(\varphi_1-\varphi_2)} S$$

$$\frac{\partial C}{\partial \alpha_2} = -\vec{R}_{on}^H \vec{X}_2 + \alpha_1^* \vec{X}_1^H \vec{X}_2 + \alpha_2^* \|\vec{X}_2\|^2$$
$$= -\sum_{n=0}^{63} R_{on}^*(n) R_{off}(n) e^{j2\pi\frac{v}{F_s}n+j\varphi_2} +$$
$$\alpha_1^* e^{j(\varphi_2-\varphi_1)} \sum_{n=0}^{63} |R_{off}(n)|^2 + \alpha_2^*\left(\|\vec{R}_{off}\|^2 + \sigma_N^2\right)$$
$$= -e^{j\varphi_2} P + \alpha_1^* e^{j(\varphi_2-\varphi_1)} S + \alpha_2^*(S + \sigma_N^2)$$

with:
$$\sigma_N^2 = \vec{N}_1^H \vec{N}_1 = \vec{N}_2^H \vec{N}_2,$$
$$S = \sum_{n=0}^{63} |R_{off}(n)|^2 \text{ and } P = \sum_{n=0}^{63} R_{on}^*(n) R_{off}(n) e^{-j2\pi\frac{v}{F_s}n}.$$

In preferred embodiments of the invention, it is assumed that $\vec{N}_1^H \vec{N}_2 = \vec{N}_1^H \vec{X}_2 = \vec{N}_2^H \vec{X}_1 = \vec{N}_1^H \vec{R} = \vec{N}_2^H \vec{R} = 0$. Such assumption may not be exactly true in reality, but dramatically simplifies the equations and therefore the computer processing required. This proceeds as, $$\begin{cases} \dfrac{\partial C}{\partial \alpha_1} = 0 \\ \dfrac{\partial C}{\partial \alpha_2} = 0 \end{cases} \Rightarrow \begin{bmatrix} S + \sigma_N^2 & e^{j(\varphi_1 - \varphi_2)} S \\ e^{j(\varphi_2 - \varphi_1)} S & S + \sigma_N^2 \end{bmatrix} \begin{bmatrix} \alpha_1^* \\ \alpha_2^* \end{bmatrix} = \begin{bmatrix} e^{j\varphi_1} P \\ e^{j\varphi_2} P \end{bmatrix}$$

$$\Leftrightarrow \begin{bmatrix} \alpha_1 \\ \alpha_2 \end{bmatrix} = \dfrac{1}{(S + \sigma_N^2)^2 - S^2} \begin{bmatrix} S + \sigma_N^2 & -e^{j(\varphi_2 - \varphi_1)} S \\ -e^{j(\varphi_1 - \varphi_2)} S & S + \sigma_N^2 \end{bmatrix} \begin{bmatrix} e^{-j\varphi_1} P^* \\ e^{-j\varphi_2} P^* \end{bmatrix}$$

$$\Leftrightarrow \begin{bmatrix} \alpha_1 \\ \alpha_2 \end{bmatrix} = \dfrac{P^*}{2S + \sigma_N^2} \begin{bmatrix} e^{-j\varphi_1} \\ e^{-j\varphi_2} \end{bmatrix}.$$

In the absence of any timing misalignment, frequency offset or Gaussian noise, the weighting coefficients are simply, $$\begin{bmatrix} \alpha_1 \\ \alpha_2 \end{bmatrix} = \dfrac{1}{2} \begin{bmatrix} e^{-j\varphi_1} \\ e^{-j\varphi_2} \end{bmatrix}.$$

A reconstructed signal $\vec{Z}$ is, $$\vec{Z} = \alpha_1 \vec{X}_1 + \alpha_2 \vec{X}_2 =$$

$$\dfrac{P^*}{2S + \sigma_N^2} \left( e^{-j\varphi_1} (\vec{C}_1 \cdot \times \vec{R}_{off} + \vec{N}_1) + e^{-j\varphi_2} (\vec{C}_2 \cdot \times \vec{R}_{off} + \vec{N}_2) \right) =$$

$$\dfrac{P^*}{2S + \sigma_N^2} (2\vec{C} \cdot \times \vec{R}_{off} + \vec{N})$$

With: $\vec{C} = \begin{vmatrix} 1 \\ e^{j2\pi \frac{v}{F_s}} \\ \vdots \\ e^{j2\pi \frac{v}{F_s} 63} \end{vmatrix}$, Looking closer at P*, $$P^* = \sum_{n=0}^{63} R_{off}^*(n) R_{on}(n) e^{-j2\pi \frac{v}{F_s} n} = \sum_{n=0}^{63} (R_{on}(n) + \Delta(n))^* R_{on}(n) e^{-j2\pi \frac{v}{F_s} n} =$$

$$P_{on}^* + \sum_{n=0}^{63} \Delta^*(n) R_{on}(n) e^{-j2\pi \frac{v}{F_s} n} = P_{on}^* + P_\Delta^*.$$

Because $R_{on}(32-n) = R_{on}(32+n)$ for $n=1 \ldots 31$ and $R_{on}(0) = -R_{on}(32)$, $P^*_{on}$ can be rewritten as, $$P_{on}^* = |R_{on}(0)|^2 + \underbrace{\left( |R_{on}(32)|^2 + 2 \sum_{n=1}^{31} |R_{on}(32+n)|^2 \cos\left(2\pi \dfrac{v}{F_s} n\right) \right)}_{\Gamma(v)} e^{-j2\pi \frac{v}{F_s} 32}.$$

Because $\Gamma(v)$ is real and much greater than $|R_{on}(0)|^2$, the result is $$\angle P_{on}^* \cong -2\pi \dfrac{v}{F_s} 32 \text{ radian.}$$

Thus, P* is composed of two phase coefficients, a first one (P*$_{on}$) centers the frequency offset related phase component around Z(32), and the second one (P*$_\Delta$) contains timing-misalignment information. Once $\vec{Z}$ has been computed, the absolute value and sign of the timing misalignment are determined by computing dot products, as in, $$\gamma_{value} = \dfrac{|\vec{Z}^H \vec{R}_{on}|}{\|\vec{R}_{on}\|^2} \dfrac{\lambda_{max}}{\lambda_{max} - \lambda_{min}}$$

Where: $\{\lambda_{max}, \lambda_{min}\} = \text{eig}(M^H M)$ with $M = [\vec{X}_1 \ \vec{X}_2]$.

$$\gamma_{sign} = \text{Re}\left( \vec{Z}^H \dfrac{\partial \vec{R}_{on}}{\partial t} \right).$$

Because $\Lambda = M^H M$ is a 2×2 matrix, $\det(\Lambda) = \lambda_{max} \lambda_{min}$ and $\text{trace}(\Lambda) = \lambda_{max} + \lambda_{min}$. It is then easy to get back to $\lambda_{max}$ and $\lambda_{min}$.

The timing misalignment is deduced from $\gamma_{value}$ and $\gamma_{sign}$, e.g.

$$\tau = f(\gamma_{value}, \gamma_{sign}) = \text{sign}(\gamma_{sign}) \sqrt{-\dfrac{332}{791} \log(\gamma_{value})}.$$

Plotting $\gamma_{value} = g(\tau)$ for $$\tau \in \left[ -\dfrac{T_s}{2}, \dfrac{T_s}{2} \right]$$

results in a symmetrical heap function that peaks with a $\gamma_{value}$ of 1.00 at a zero timing misalignment, and drops to $\gamma_{value}$ of 0.55 at a normalized timing misalignment of ±0.5.

Embodiments of the invention all operate well at low signal-to-noise ratios and in the presence of a relatively large residual frequency offsets. The second embodiment of the invention presented herein is preferred for lower signal-to-noise ratio signals. Any performance deterioration at high signal-to-noise ratios can probably be corrected by regularizing the covariance matrix, e.g. using Tikhonov regularization.

Figure 5:
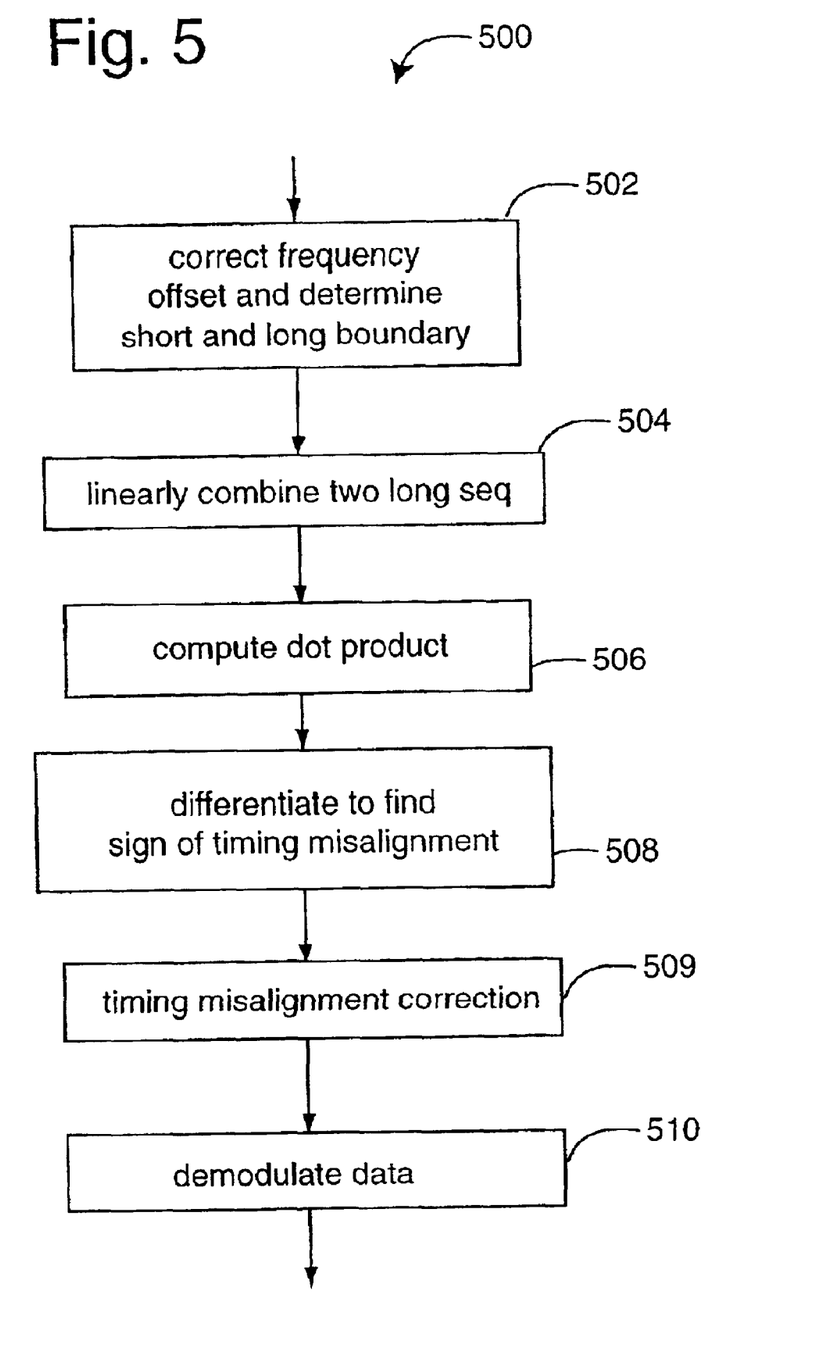
FIG. 5 is a flowchart of a second embodiment of the invention for determining the timing misalignment from the long-preamble interval in the structure of FIG. 2.

FIG. 5 represents a second embodiment of the invention for timing misalignment determination in a radio receiver, and is referred to herein by the general reference numeral 500. The embodiment 500 comprises a step element 502 for determining a boundary between a short preamble and a long preamble in a received radio signal; an exemplary method of doing this is listed in "OFDM Data Demodulator Timing Synchronization—Patent Disclosure", John Reagan, Alain Chiodini, nBand Communications, 2000. A step element 504 linearly combines samples of two long sequences from the long preamble to obtain an idealized sequence of samples. A step element 506 computes a normalized dot product of the idealized sequence of samples and an ideal on-baud sampled sequence to obtain a magnitude estimate of any timing misalignment. A step element 508 computes a dot product of the idealized sequence of samples and the time derivative of the ideal on-baud sampled sequence mentioned above to obtain the sign of the timing misalignment if any. Thus data encoded in the received radio signal may thereafter be demodulated in step element 510. The steps of linearly combining and computing can use a cost function, mathematically described by, $$C(\alpha_1, \alpha_2) = \left\| \vec{R}_{on} - [\vec{X}_1 \ \vec{X}_2] \begin{bmatrix} \alpha_1 \\ \alpha_2 \end{bmatrix} \right\|^2$$

-continued $$= \left(\vec{R}_{on} - [\vec{X}_1 \ \vec{X}_2]\begin{bmatrix}\alpha_1\\\alpha_2\end{bmatrix}\right)^H \left(\vec{R}_{on} - [\vec{X}_1 \ \vec{X}_2]\begin{bmatrix}\alpha_1\\\alpha_2\end{bmatrix}\right)$$

$$= \left(\vec{R}_{on}^H - \alpha_1^* \vec{X}_1^H - \alpha_2^* \vec{X}_2^H\right)\left(\vec{R}_{on} - \alpha_1 \vec{X}_1 - \alpha_2 \vec{X}_2\right)$$

$$= \|\vec{R}_{on}\|^2 - 2\mathrm{Re}\left(\alpha_1^* \vec{X}_1^H \vec{R}_{on}\right) - 2\mathrm{Re}\left(\alpha_2^* \vec{X}_2^H \vec{R}_{on}\right) +$$

$$2\mathrm{Re}\left(\alpha_1^* \alpha_2 \vec{X}_1^H \vec{X}_2\right) + |\alpha_1|^2 \|\vec{X}_1\|^2 + |\alpha_2|^2 \|\vec{X}_2\|^2$$

where, $\vec{X}_1 = \vec{C}_1 \cdot x \vec{R}_{off} + \vec{N}_1$ is the first sequence of the long preamble, $\vec{X}_2 = \vec{C}_2 \cdot x \vec{R}_{off} + \vec{N}_2$ is the second one, $\vec{R}_{on}$ and $\vec{R}_{off}$ respectively designate the on-baud and off-baud sampled reference sequence, $\alpha_1$ and $\alpha_2$ are the weighting coefficients, $$\vec{C}_1 = \begin{vmatrix} e^{j\varphi_1} \\ e^{j2\pi \frac{v}{F_s} + j\varphi_1} \\ \vdots \\ e^{j2\pi \frac{v}{F_s}63 + j\varphi_1} \end{vmatrix}, \quad \vec{C}_2 = \begin{vmatrix} e^{j\varphi_2} \\ e^{j2\pi \frac{v}{F_s} + j\varphi_2} \\ \vdots \\ e^{j2\pi \frac{v}{F_s}63 + j\varphi_2} \end{vmatrix}, \text{ and}$$

$v$ designates the frequency offset.

and, minimizing $C(\alpha_1, \alpha_2)$ with respect to $\alpha_1$ and $\alpha_2$ yields, $$\frac{\partial C}{\partial \alpha_1} = -\vec{R}_{on}^H \vec{X}_1 + \alpha_2^* \vec{X}_2^H \vec{X}_1 + \alpha_1^* \|\vec{X}_1\|^2$$

$$= -\sum_{n=0}^{63} R_{on}^*(n) R_{off}(n) e^{j2\pi \frac{v}{F_s} n + j\varphi_1} + \alpha_2^* e^{j(\varphi_1 - \varphi_2)}$$

$$\sum_{n=0}^{63} |R_{off}(n)|^2 + \alpha_1^* \left(\|\vec{R}_{off}\|^2 + \sigma_N^2\right)$$

$$= -e^{j\varphi_1} P + \alpha_1^*(S + \sigma_N^2) + \alpha_2^* e^{j(\varphi_1 - \varphi_2)} S$$

$$\frac{\partial C}{\partial \alpha_2} = -\vec{R}_{on}^H \vec{X}_2 + \alpha_1^* \vec{X}_1^H \vec{X}_2 + \alpha_2^* \|\vec{X}_2\|^2$$

$$= -\sum_{n=0}^{63} R_{on}^*(n) R_{off}(n) e^{j2\pi \frac{v}{F_s} n + j\varphi_2} + \alpha_1^* e^{j(\varphi_2 - \varphi_1)}$$

$$\sum_{n=0}^{63} |R_{off}(n)|^2 + \alpha_2^* \left(\|\vec{R}_{off}\|^2 + \sigma_N^2\right)$$

$$= -e^{j\varphi_2} P + \alpha_1^* e^{j(\varphi_2 - \varphi_1)} S + \alpha_2^*(S + \sigma_N^2)$$

With: $\sigma_N^2 = \vec{N}_1^H \vec{N}_1 = \vec{N}_2^H \vec{N}_2$, $$S = \sum_{n=0}^{63} |R_{off}(n)|^2 \text{ and } P = \sum_{n=0}^{63} R_{on}^*(n) R_{off}(n) e^{-j2\pi \frac{v}{F_s} n}$$

The method preferably assumes that $\vec{N}_1^H \vec{N}_2 = \vec{N}_1^H \vec{X}_2 = \vec{N}_2^H \vec{X}_1 = \vec{N}_1^H \vec{R} = \vec{N}_2^H \vec{R} = 0$, although such is not exactly true in reality, and thereby reduces the overall computer processing required. Thus, the process can continue with, $$\begin{cases} \frac{\partial C}{\partial \alpha_1} = 0 \\ \frac{\partial C}{\partial \alpha_2} = 0 \end{cases} \Rightarrow \begin{bmatrix} S + \sigma_N^2 & e^{j(\varphi_1 - \varphi_2)} S \\ e^{j(\varphi_2 - \varphi_1)} S & S + \sigma_N^2 \end{bmatrix} \begin{bmatrix} \alpha_1^* \\ \alpha_2^* \end{bmatrix} = \begin{bmatrix} e^{j\varphi_1} P \\ e^{j\varphi_2} P \end{bmatrix}$$

$$\Leftrightarrow \begin{bmatrix} \alpha_1 \\ \alpha_2 \end{bmatrix} = \frac{1}{(S + \sigma_N^2)^2 - S^2} \begin{bmatrix} S + \sigma_N^2 & -e^{j(\varphi_1 - \varphi_2)} S \\ -e^{j(\varphi_2 - \varphi_1)} S & S + \sigma_N^2 \end{bmatrix} \begin{bmatrix} e^{-j\varphi_1} P^* \\ e^{-j\varphi_2} P^* \end{bmatrix}$$

$$\Leftrightarrow \begin{bmatrix} \alpha_1 \\ \alpha_2 \end{bmatrix} = \frac{P^*}{2S + \sigma_N^2} \begin{bmatrix} e^{-j\varphi_1} \\ e^{-j\varphi_2} \end{bmatrix}$$

in the absence of any timing misalignment, frequency offset or Gaussian noise, the weighting coefficients are simply, $$\begin{bmatrix} \alpha_1 \\ \alpha_2 \end{bmatrix} = \frac{1}{2} \begin{bmatrix} e^{-j\varphi_1} \\ e^{-j\varphi_2} \end{bmatrix}.$$

The method is such that the steps of linearly combining and computing produce an $\Gamma(v)$ that is real and much greater than $|R_{on}(0)|^2$, and the result is $$\angle P_{on}^* \cong -2\pi \frac{v}{F_s} 32 \text{ radian,}$$

and wherein, P* is composed of two phase coefficients, a first one (P*$_{on}$) centers the frequency offset related phase component around Z(32), and the second one (P*$_\Delta$) contains timing-misalignment information. A result $\vec{Z}$ is found, and the absolute value and sign of the timing misalignment can be determined by computing dot products, as in, $$\gamma_{value} = \frac{\left|\vec{Z}^H \vec{R}_{on}\right|}{\|\vec{R}_{on}\|^2} \frac{\lambda_{max}}{\lambda_{max} - \lambda_{min}}$$

where: $\{\lambda_{max}, \lambda_{min}\} = \mathrm{eig}(M^H M)$ with $M = [\vec{X}_1 \ \vec{X}_2]$, and $$\gamma_{sign} = \mathrm{Re}\left(\vec{Z}^H \frac{\partial \vec{R}_{on}}{\partial t}\right).$$

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for timing misalignment determination in a radio receiver, comprising the steps of:
   correcting a frequency offset and determining a boundary between a short and long preamble in a received radio signal;
   constructing a real signal from a complex time-domain signal associated with said short preamble;
   extracting an n-sample sequence from a portion of said short preamble to obtain a plurality of equidistant equal amplitude frequency peaks wherein n is an integer greater than or equal to zero; and
   determining a timing offset estimate based on the relative phases of said plurality of equidistant equal amplitude frequency peaks.

2. The method of claim 1, wherein:
the step of constructing includes in-phase and quadrature-phase sampling of said received radio signal to obtain a real part and an imaginary part;
wherein said real and imaginary parts are similar to one another except for a fixed time-skew between them.

3. The method of claim 2, wherein:
the step of constructing includes a simple addition of said real and imaginary parts to obtain said real signal.

4. The method of claim 1, wherein:
the step of determining is such that the phase of a set of three frequency peaks $\Phi_1$, $\Phi_2$ and $\Phi_3$ is assumed to vary with timing misalignment between $\Delta(t)$ and $\delta(t)$, and an intra-baud timing offset $\tau$ is derived from $\Phi_1$, $\Phi_2$ and $\Phi_3$ wherein, a received signal is represented by, $$\Psi(t) = \Phi_1(t) + 2\Phi_2(t) + \Phi_3(t) =$$
$$\frac{\pi}{4}\left(1 + \frac{t}{T_s}\right) + 2\frac{\pi}{4}\left(1 + 2\frac{t}{T_s}\right) + 3\frac{\pi}{4}\left(-1 + 2\frac{t}{T_s}\right) = 2\pi \frac{t}{T_s}$$

and, $\Psi=(X_8P_1)(X_{16}P_2)^2(X_{24}P_3)$, where $X_k$ and $P_n$ respectively designate 64-point fast Fourier transform frequency components and phase correcting coefficients needed to compensate for phase offset errors caused by said timing misalignment between $\Delta(t)$ and $\delta(t)$, and the timing misalignment $\tau$ is expressed as a fraction of a sampling period, $T_s$, and is $$\tau = \frac{\Psi}{\pi}.$$

5. The method of claim 1, wherein:
the step of determining computes a 64-point fast Fourier transform rather than a three-point discrete Fourier transform.

6. A method for timing misalignment determination in a radio receiver, comprising the steps of:
determining a boundary between a short preamble and a long preamble in a received radio signal;
linearly combining samples of two long sequences from said long preamble to obtain an idealized sequence of samples that best approaches under a certain criterion an ideal sequence of samples;
computing a normalized dot product of said idealized sequence of samples and an ideal on-baud sampled sequence to obtain a magnitude estimate of any timing misalignment; and
computing a dot product of said idealized sequence of samples and the time derivative of the ideal on-baud sampled sequence mentioned above to obtain a sign of any timing misalignment.

7. The method of claim 6, wherein the steps of linearly combining and computing use a cost function mathematically described by, $$C(\alpha_1, \alpha_2) = \left\| \vec{R}_{on} - [\vec{X}_1 \ \vec{X}_2]\begin{bmatrix}\alpha_1 \\ \alpha_2\end{bmatrix} \right\|^2$$

$$= \left(\vec{R}_{on} - [\vec{X}_1 \ \vec{X}_2]\begin{bmatrix}\alpha_1 \\ \alpha_2\end{bmatrix}\right)^H \left(\vec{R}_{on} - [\vec{X}_1 \ \vec{X}_2]\begin{bmatrix}\alpha_1 \\ \alpha_2\end{bmatrix}\right)$$

$$= \left(\vec{R}_{on}^H - \alpha_1^*\vec{X}_1^H - \alpha_2^*\vec{X}_2^H\right)\left(\vec{R}_{on} - \alpha_1\vec{X}_1 - \alpha_2\vec{X}_2\right)$$

-continued
$$= \|\vec{R}_{on}\|^2 - 2\text{Re}\left(\alpha_1^*\vec{X}_1^H\vec{R}_{on}\right) - 2\text{Re}\left(\alpha_2^*\vec{X}_2^H\vec{R}_{on}\right) +$$
$$2\text{Re}\left(\alpha_1^*\alpha_2\vec{X}_1^H\vec{X}_2\right) + |\alpha_1|^2\|\vec{X}_1\|^2 + |\alpha_2|^2 + \|\vec{X}_2\|^2$$

where, $\vec{X}_1 = \vec{C}_1 \cdot x\vec{R}_{off} + \vec{N}_1$ is the first sequence of the long preamble, $\vec{X}_2 = \vec{C}_2 \cdot x\vec{R}_{off} + \vec{N}_2$ is the second one, $\vec{R}_{on}$ and $\vec{R}_{off}$ respectively designate on-baud and off-baud sampled reference sequence, $\alpha_1$ and $\alpha_2$ are the weighting coefficients, $$\vec{C}_1 = \begin{vmatrix} e^{j\varphi_1} \\ e^{j2\pi\frac{\nu}{F_s}+j\varphi_1} \\ \vdots \\ e^{j2\pi\frac{\nu}{F_s}63+j\varphi_1} \end{vmatrix} \quad \vec{C}_2 = \begin{bmatrix} e^{j\varphi_2} \\ e^{j2\pi\frac{\nu}{F_s}+j\varphi_2} \\ \vdots \\ e^{j2\pi\frac{\nu}{F_s}63+j\varphi_2} \end{bmatrix}, \text{ and}$$

$\nu$ designates a frequency offset
and, minimizing $C(\alpha_1,\alpha_2)$ with respect to $\alpha_1$ and $\alpha_2$ yields, $$\frac{\partial C}{\partial \alpha_1} = -\vec{R}_{on}^H\vec{X}_1 + \alpha_2^*\vec{X}_2^H\vec{X}_1 + \alpha_1^*\|\vec{X}_1\|^2$$

$$= \sum_{n=0}^{63} R_{on}^*(n)R_{off}(n)e^{j2\pi\frac{\nu}{F_s}n+j\varphi_1} + \alpha_2^*e^{j(\varphi_1-\varphi_2)}$$

$$\sum_{n=0}^{63} |R_{off}(n)|^2 + \alpha_1^*\left(\|\vec{R}_{off}\|^2 + \sigma_N^2\right)$$

$$= -e^{j\varphi_1}P + \alpha_1^*(S + \sigma_N^2) + \alpha_2^*e^{j(\varphi_1-\varphi_2)}S$$

$$\frac{\partial C}{\partial \alpha_2} = -\vec{R}_{on}^H\vec{X}_2 + \alpha_1^*\vec{X}_1^H\vec{X}_2 + \alpha_2^*\|\vec{X}_2\|^2$$

$$= -\sum_{n=0}^{63} R_{on}^*(n)R_{off}(n)e^{j2\pi\frac{\nu}{F_s}n+j\varphi_2} + \alpha_1^*e^{j(\varphi_2-\varphi_1)}$$

$$\sum_{n=0}^{63} |R_{off}(n)|^2 + \alpha_2^*\left(\|\vec{R}_{off}\|^2 + \sigma_N^2\right)$$

$$= -e^{j\varphi_2}P + \alpha_1^*e^{j(\varphi_2-\varphi_1)}S + \alpha_2^*(S + \sigma_N^2)$$

with: $\sigma_N^2 = \vec{N}_1^H\vec{N}_1 = \vec{N}_2^H\vec{N}_2$, $$S = \sum_{n=0}^{63} |R_{off}(n)|^2 \text{ and } P = \sum_{n=0}^{63} R_{on}^*(n)R_{off}(n)e^{-j2\pi\frac{\nu}{F_s}n}.$$

8. The method of claim 7, wherein the steps of linearly combining and computing assume that $\vec{N}_1^H\vec{N}_2 = \vec{N}_1^H\vec{X}_2 = \vec{N}_2^H\vec{X}_1 = \vec{N}_1^H\vec{R} = \vec{N}_2^H\vec{R} = 0$, although such is not exactly true in reality, and thereby reduces computer processing required; and continuing with, $$\begin{cases} \frac{\partial C}{\partial \alpha_1} = 0 \\ \frac{\partial C}{\partial \alpha_2} = 0 \end{cases} \Rightarrow \begin{bmatrix} S+\sigma_N^2 & e^{j(\varphi_1-\varphi_2)}S \\ e^{j(\varphi_2-\varphi_1)}S & S+\sigma_N^2 \end{bmatrix}\begin{bmatrix}\alpha_1^* \\ \alpha_2^*\end{bmatrix} = \begin{bmatrix}e^{j\varphi_1}P \\ e^{j\varphi_2}P\end{bmatrix}$$

-continued $$\Leftrightarrow \begin{bmatrix} \alpha_1 \\ \alpha_2 \end{bmatrix} = \frac{1}{(S+\sigma_N^2)^2 - S^2} \begin{bmatrix} S+\sigma_N^2 & -e^{j(\varphi_2-\varphi_1)}S \\ -e^{j(\varphi_1-\varphi_2)}S & S+\sigma_N^2 \end{bmatrix} \begin{bmatrix} e^{-j\varphi_1}P^* \\ e^{-j\varphi_2}P^* \end{bmatrix}$$

$$\Leftrightarrow \begin{bmatrix} \alpha_1 \\ \alpha_2 \end{bmatrix} = \frac{P^*}{2S+\sigma_N^2} \begin{bmatrix} e^{-j\varphi_1} \\ e^{-j\varphi_2} \end{bmatrix}$$

in the absence of any timing misalignment, frequency offset or Gaussian noise, the weighting coefficients are simply, $$\begin{bmatrix} \alpha_1 \\ \alpha_2 \end{bmatrix} = \frac{1}{2} \begin{bmatrix} e^{-j\varphi_1} \\ e^{-j\varphi_2} \end{bmatrix}.$$

* * * * *